(No Model.)
F. I. ROGERS.
COOKING UTENSIL.
No. 594,652.  Patented Nov. 30, 1897.
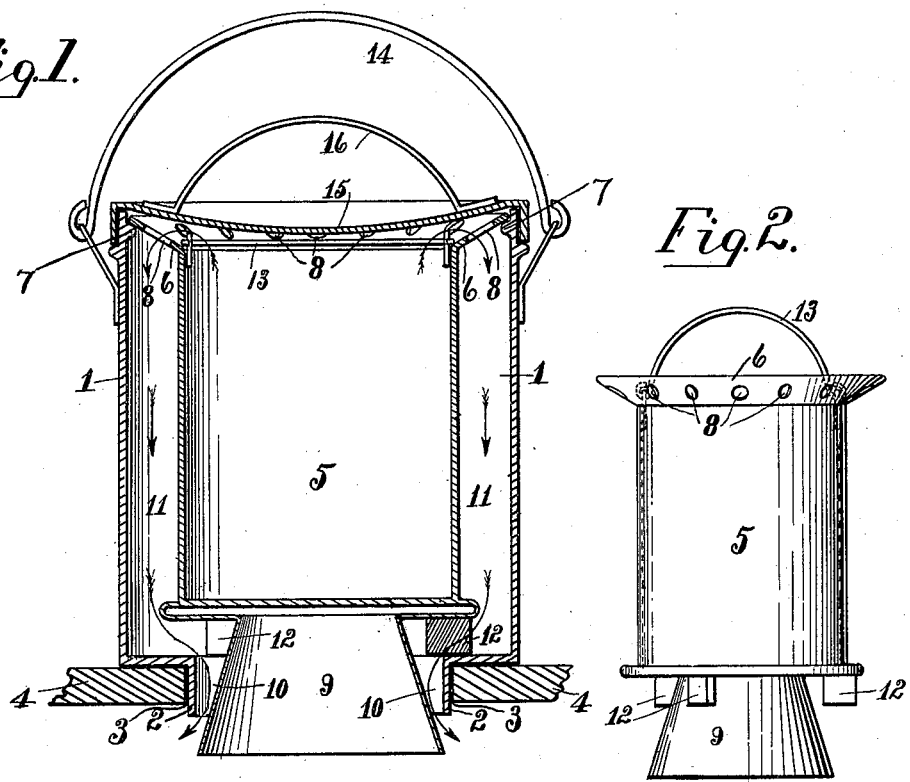
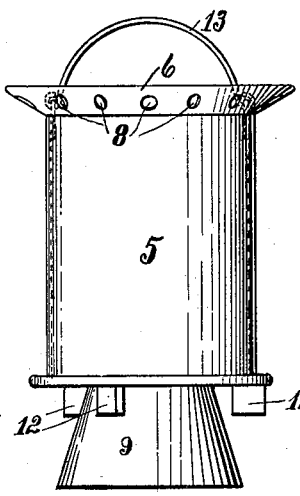
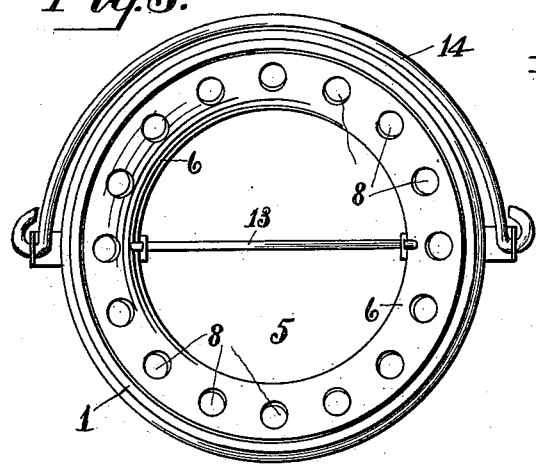
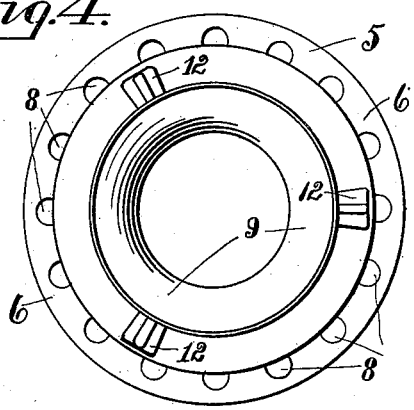
Witnesses.
Walter C Pusey.
John F. Nolan
Inventor.
Francis I. Rogers,
per Joshua Pusey,
Attorney.

UNITED STATES PATENT OFFICE.

FRANCIS I. ROGERS, OF PHILADELPHIA, PENNSYLVANIA.

COOKING UTENSIL.

SPECIFICATION forming part of Letters Patent No. 594,652, dated November 30, 1897.

Application filed May 12, 1897. Serial No. 636,210. (No model.)

*To all whom it may concern:*

Be it known that I, FRANCIS I. ROGERS, a citizen of the United States, and a resident of the city and county of Philadelphia and State of Pennsylvania, have invented certain new and useful Improvements in Cooking Utensils, of which the following is a full, clear, and exact description, reference being had to the accompanying drawings, of which—

Figure 1 is a vertical medial section through my cooking-pot; Fig. 2, a side elevation of the inner vessel removed and shown on a reduced scale; Fig. 3, a plan view of my pot, the lid having been removed. Fig. 4 is a reverse plan view of the inner vessel.

This invention relates especially to that kind or class of cooking pots or kettles which are designed to prevent the escape of unpleasant odors arising from the cooking of certain vegetables, &c., by providing means for permitting the vapors to descend into the fire-space, whence they pass out by the flue or chimney with the products of combustion; and the invention has for its object to improve the construction and secure a more perfect operation of cooking-pots of the said class.

The character of the improvements that I have made will clearly appear from the following description, reference being had to the accompanying drawings, in which—

1 is an outer cylindrical vessel, open at top and bottom and contracted at the lower end 2 to a diameter somewhat less than that of the usual hole 3 in the top plate 4 of a cooking range or stove, so that the said end portion may be entered into the plate-hole, and the part of the bottom of the vessel between the said end portion and the outer periphery of the vessel will rest upon the said top plate, as shown in Fig. 1.

Within the vessel 1 I place a second cylindrical vessel, or the boiling-pot proper, 5, that is considerably less in diameter than the outer vessel. This pot is removable, and its upper end is provided with a circular inclined flange 6, whose outer edge rests upon an internal bead 7 of the vessel 1. This flange is provided with a series of apertures 8. Below the bottom of and connected to the lower end of the pot 5 is an inverted funnel-like extension 9, that projects downwardly through, and some distance below, the contracted part 2 of the vessel 1, but leaving a circular passage-way 10, that communicates with the space 11 between the inner side of the said extension for supporting the pot on the inset part of the outer vessel. I provide hinged bails 13 and 14 for the inner and outer vessels, respectively.

15 is a detachable lid or cover adapted to fit over the top of the outer vessel. This cover I make convex on the under side, as shown, and I usually provide the same with a handle 16.

Having thus described the construction of my invention, I shall now describe the mode of operation thereof, as follows: Premising that the outer vessel is in place upon the top plate of the range or stove, as shown in Fig. 1, and the pot 5 is also in place, as shown in said figure, the articles to be boiled or cooked are placed within the said pot, the lid 15 being then put on. The heat from the fire within the range strikes against the under side of the pot 5, and when the boiling begins the steam charged with the odor escaping from the articles within the pot passes through the apertures 8, thence downwardly through the space or passage-way 11, past the funnel-like extension 9, and is deflected by the latter outwardly and downwardly, all as indicated by the arrows in Fig. 1, whence it finds its way to the flue or chimney, and thus the cooking may proceed without it being possible to detect any odors, although such vegetables as onions, cabbage, and the like may be within the pot. Owing to the convexity of the cover 15, the steam condensed upon the under surface thereof runs toward the center of the lid and then drops back into the pot.

The extension 2 of the outer vessel insures the delivery of all of the steam or vapor into the fire-chamber by preventing the escape of any portion thereof out underneath the bottom of such vessel into the room in case the vessel does not sit closely upon the top plate of the stove or range. The extension 9 of the inner vessel not only forms a heating-chamber, but it also acts as a guard to prevent smoke and gases of combustion from the fire-chamber passing upward into the utensil.

Having thus described my invention, I claim as new and desire to secure by Letters Patent—

In a cooking utensil of the class described, the combination of the outer vessel having at its lower end a contracted open extension adapted to enter the hole of the top plate of a stove or range, and the inner vessel of less diameter than the outer one and having at its upper edge an upwardly and outwardly flaring perforated flange, and at its lower end an inverted-funnel-shaped extension of less diameter than the contracted lower portion of the outer vessel and extending down through such contracted portion, together with a detachable lid or cover for said outer vessel, substantially as described.

In testimony whereof I have hereunto affixed my signature in the presence of two subscribing witnesses.

FRANCIS I. ROGERS.

Witnesses:
WALTER C. PUSEY,
ESTHER S. ROGERS.